April 25, 1933.   L. B. WACKMAN   1,905,969
BUSHING AND SOLDER SEALED CAP THEREFOR FOR METALLIC CONTAINERS
Filed Aug. 11, 1930
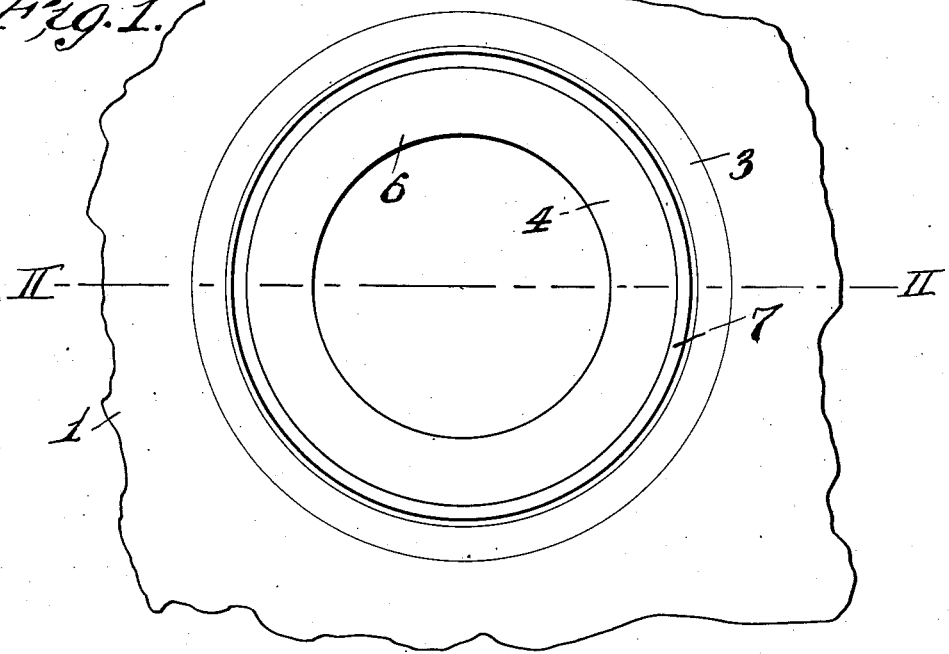
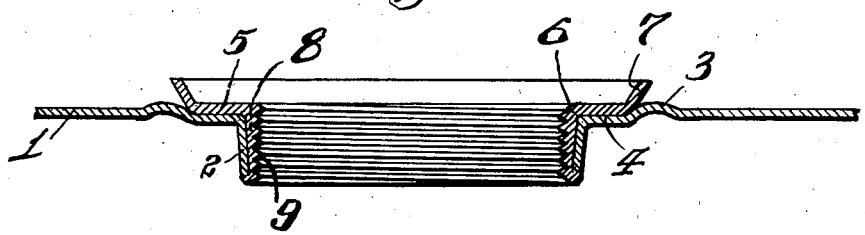
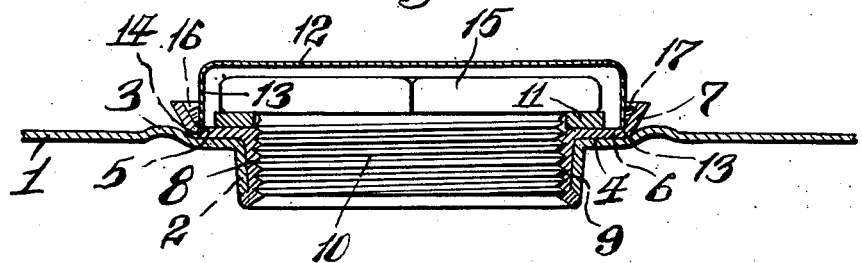
Inventor:
Louis B. Wackman,
By H. G. Fletcher
atty.

Patented Apr. 25, 1933

1,905,969

UNITED STATES PATENT OFFICE

LOUIS B. WACKMAN, OF ST. LOUIS, MISSOURI

BUSHING AND SOLDER SEALED CAP THEREFOR FOR METALLIC CONTAINERS

Application filed August 11, 1930. Serial No. 474,432.

This invention relates to improvements in a bushing and solder sealed cap therefor, the bushings being of the type used in the bung holes of metallic containers such as oil drums or barrels, the invention having for its primary object to provide a unique combination between the bushing and sealing cap so that the cap can be readily secured to the bushing by soldering.

Another object of the invention is in providing a plug bushing with means on its perimeter for providing for sealing by soldering of a sealing cap to the perimeter of the bushing.

A further object of the invention is in providing the flange of the bushing with improved means for cooperable engagement with a sealing cap so that the cap can be readily sealed to the bushing flange by soldering.

Other and further objects will appear in the specification and be specifically pointed out in the appended claims, reference being had to the accompanying drawing, exemplifying the invention, and in which:—

Figure 1 is a fragmentary plan view of a portion of a metallic container wall showing the bushing thereon.

Figure 2 is a transverse vertical section taken on the line II—II of Fig. 1.

Figure 3 is a sectional view similar to Fig. 2 but showing the closure plug and sealing cap mounted in securing and sealing relation to the bushing.

Referring by numerals to the accompanying drawing, 1 designates a portion of a metallic container wall having an opening formed therein and a depending neck 2 is formed surroundingly of the opening.

Formed concentric to the neck 2 in the wall 1 is an annular rib 3 and formed inwardly of the rib 3 is an annular seat 4 for the reception of the annular flange 5 of a bushing 6.

Formed integral with the flange of the bushing 6 is an upturned outwardly inclining lip 7 and extending from the flange in opposite disposition to the lip 7 is a bushing neck 8 which is interiorly threaded as designated at 9, said bushing neck being seated in the neck 2 of the wall portion 1, the bushing 6 being held against turning in the neck 2 in a desired manner such as by welding the lower extremities of the bushing neck 8 and bung hole neck 2 together as disclosed in my pending application Serial No. 429,907.

As shown in Fig. 3, a plug 10 is engaged in the threads 9 of the opening of the bushing for closing the same after the container has been filled with a content such as oil or gasoline, a gasket 11 however being engaged between the plug flange and the bushing flange 5 and for securing the plug against undetectable access, a sealing cap 12 is mounted over the plug.

The cap 12 is made of a light sheet metal and the diameter across the side wall 13 thereof is made so as to be approximate diameter of the flange 5 of the bushing so that when the cap is mounted over the tool engaging end 15 of the plug 10 the lower edge 10 thereof will flatly rest upon the bushing flange 5, the proper positioning of the side wall 13 of the cap 12 being assisted by the outwardly inclined lip 7 of the bushing flange 5 as the inclining lip 7 will form a guide for seating the cap in position.

After the plug 10 has been tightened in secured position in the bushing 6 and the cap 12 has been mounted over the plug as described, the cap is then ready for being secured to the bushing by soldering. Before the bushing 6 is mounted in the wall 1 of the container, the surface of the flange 5 and the lip 7 is coated with a hot dip tinned surface so that the solder will readily adhere to the inclining annular wall 7 and the side lip 13 of the cap 12 which also has been tinned.

As shown in Fig. 3, when the cap 12 is mounted in position, an annular valley or groove 16 is formed between the inclined lip 7 and the side wall 13 of the cap, this groove 16 assisting in the soldering operation inasmuch as it will readily retain the solder 17 in the groove.

The securing of the cap 12 in a sealed position over the plug not only seals the plug against undetectable access but in addition will provide a means of preventing leakage in the event that the liquid in the container seeps past the threads 9 and the gasket 11, such leakage heretofore frequently occurring in oil shipping containers.

After shipping and when the container has been received by the proper recipient, it can readily be noted whether the cap 12 has been tampered with as it would have to be destroyed in the event of unauthorized access to the container as the cap would have to be destroyed or mutilated. In removing the cap, a pointed tool is forced therethrough and the cap is pried from its position in which the sidewall 13 will either readily leave the solder 17 or pull the solder with it, the removal of the cap disclosing the plug 10 for applying a wrenching tool thereto for removing the plug.

In securing the sealing cap 12 in the manner shown and described it is to be noted that a bushing of this character permits the continued use of cap application from time to time when the container is refilled and sealed ready for subsequent shipments as the repeated removal of caps after shipment will always leave the valley or solder groove 16 in a condition for the ready insertion of a new sealing cap.

What I claim is:—

1. A flanged bushing for a container having an annular upturned lip on the flange thereof, a closure plug for said bushing, and a sealing cap mounted over said plug having its side wall solder sealed to said lip.

2. A flanged bushing for a container having an annular upturned lip on the flange thereof, a closure plug for said bushing, and a sealing cap mounted over said plug having its side wall disposed inwardly of said flange lip thereby forming an annular groove for the reception of a sealing solder between the said wall of said cap and said flange lip.

3. A flanged bushing for a container having an annular upwardly and outwardly inclined lip on the flange perimeter, a closure plug for said bushing, and a sealing cap mounted over said plug having the bottom edge of its side wall resting on said flange, the side wall of said cap and said lip forming a groove for the reception of a sealing solder.

4. A flanged bushing for a container having an annular upturned lip on the flange perimeter, a closure plug for said bushing, and a sealing cap having its side wall cooperate with said upturned lip for positioning it over said plug to form a groove for the reception of sealing solder for sealing the cap to the bushing.

LOUIS B. WACKMAN.